United States Patent Office 3,702,184
Patented Nov. 7, 1972

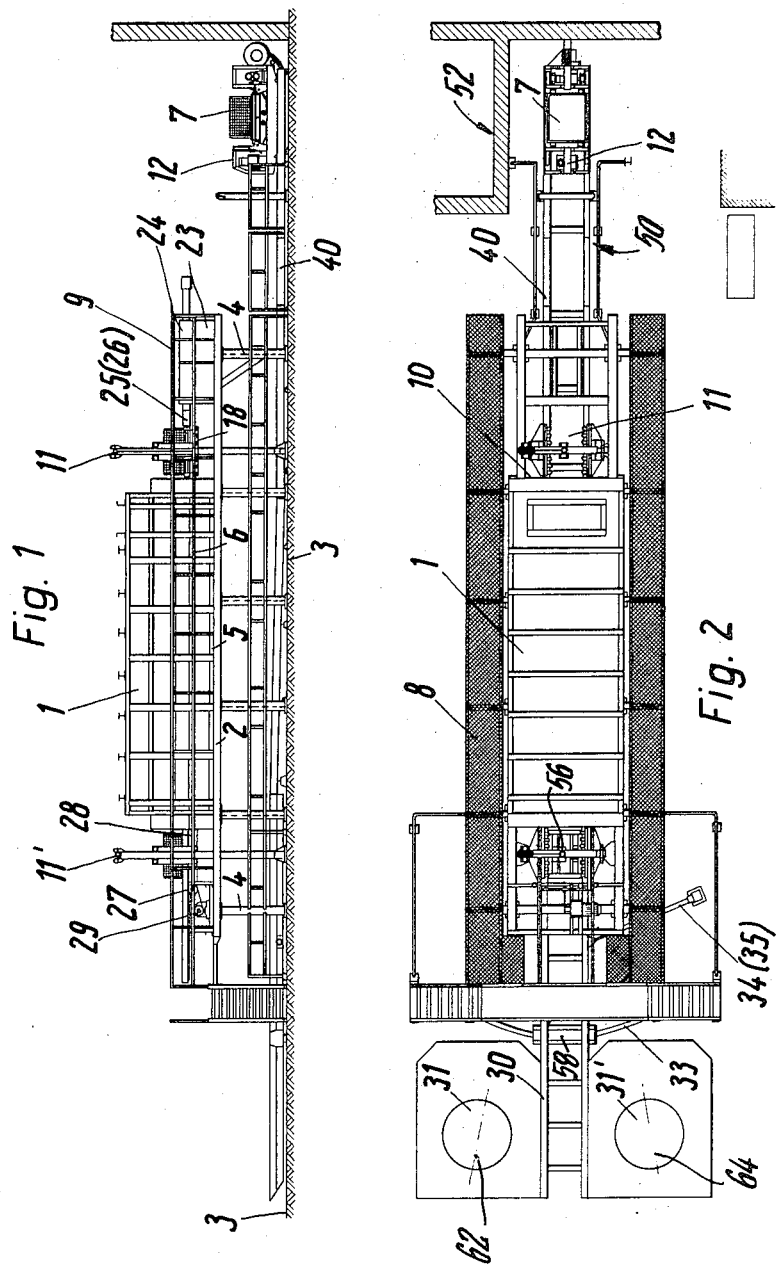

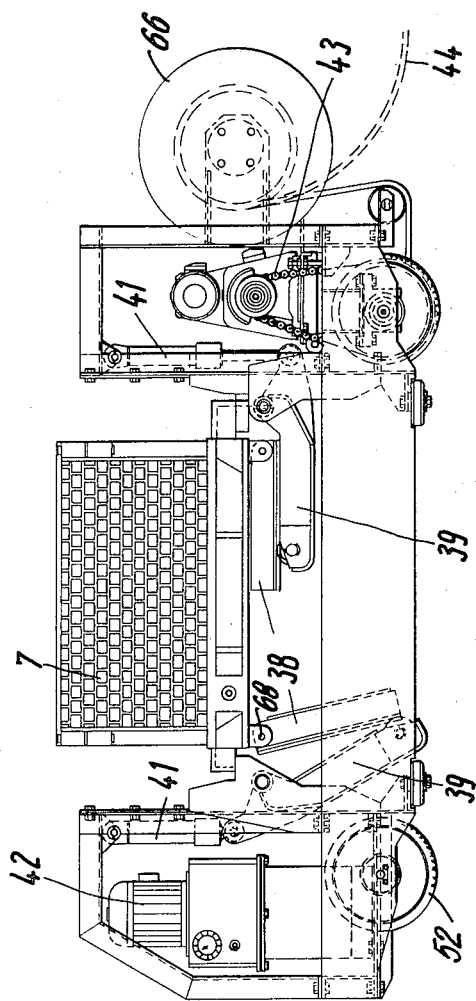
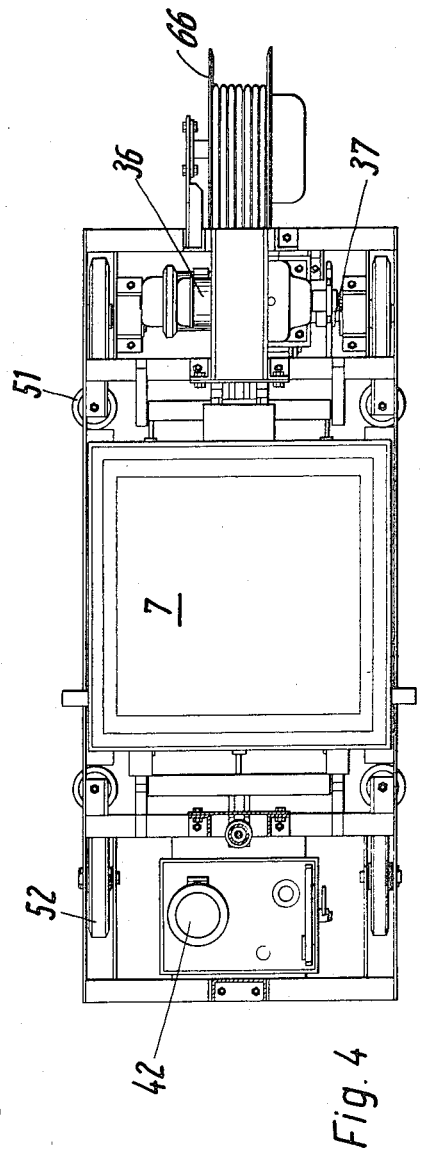
Fig. 3
Fig. 4

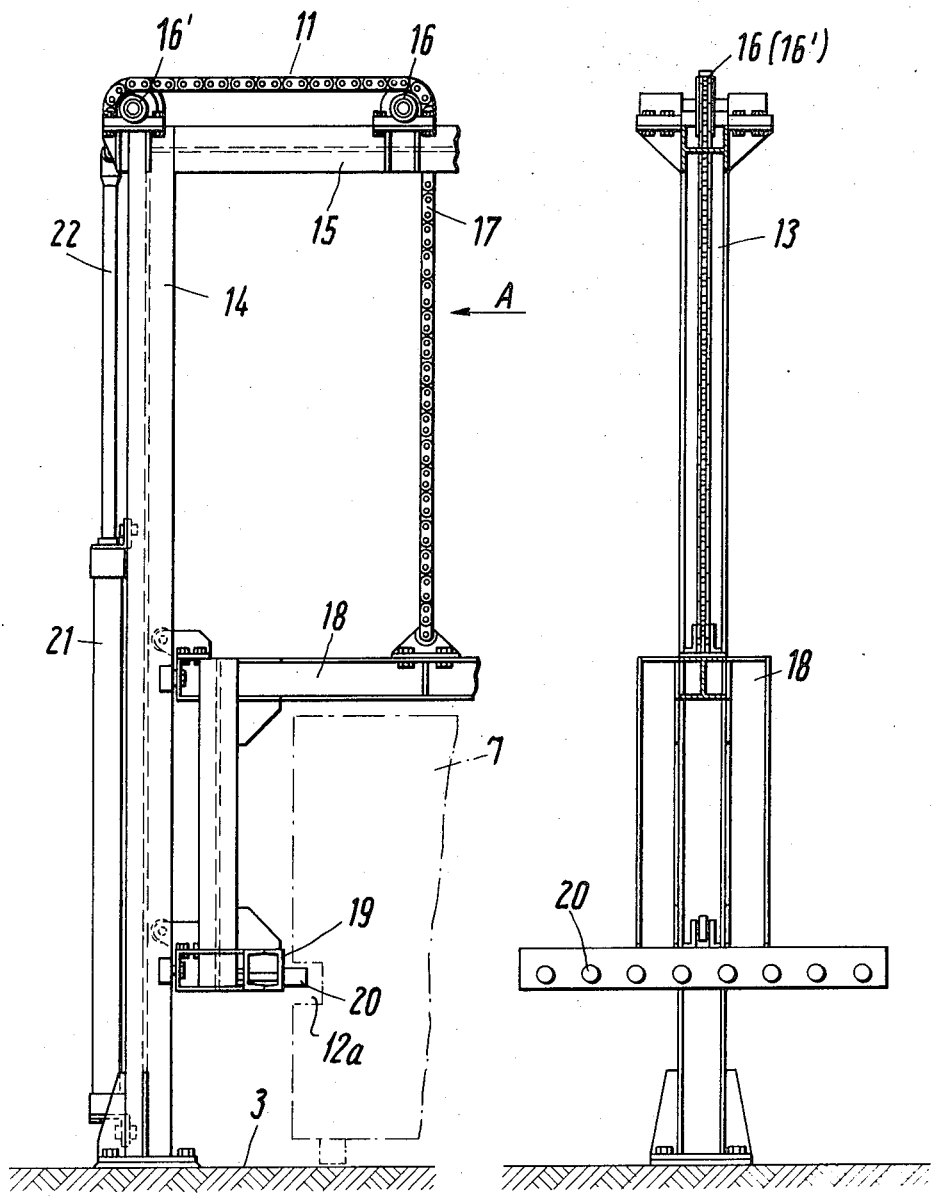

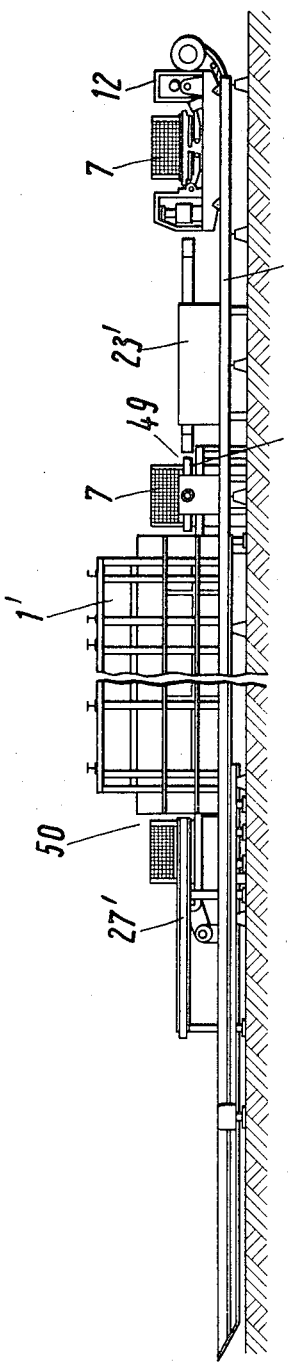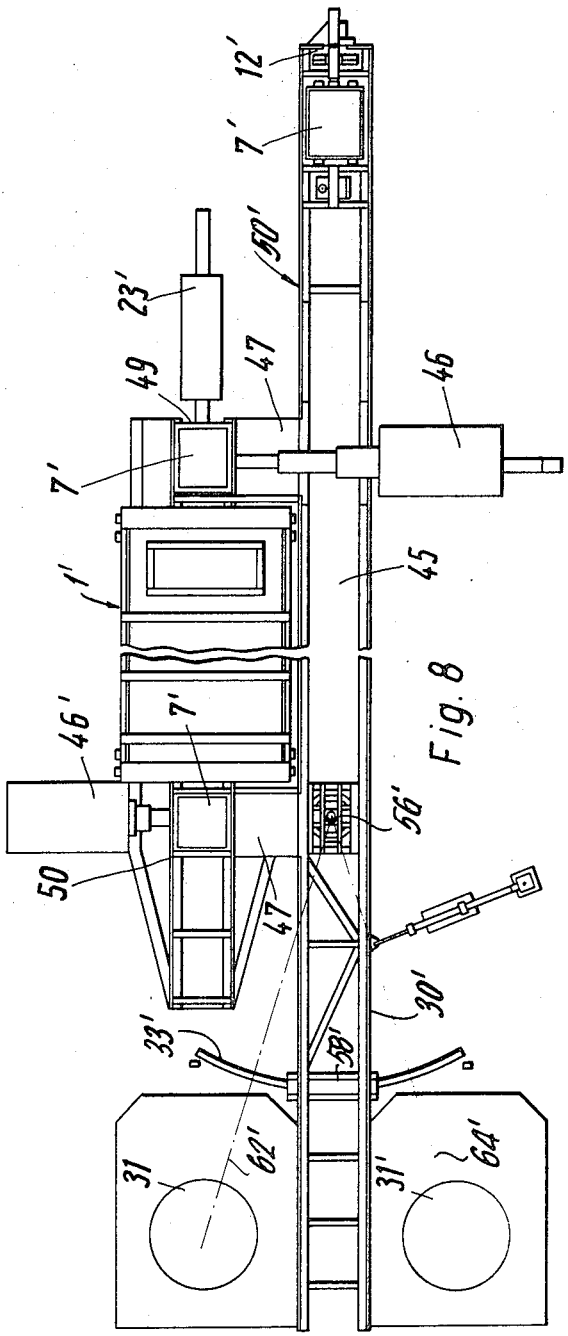

3,702,184
FURNACE INSTALLATION PARTICULARLY FOR MELTING GRAY IRON IN FOUNDRIES
Friedrich Munk and Gunter Korfer, Junkerath, Eifel, Germany, assignors to Junkerather Maschinenbau Gesellschaft mit beschrankter Haftung, Junkerath, Eifel, Germany
Filed May 10, 1971, Ser. No. 141,790
Int. Cl. C21c 1/00
U.S. Cl. 266—13
10 Claims

ABSTRACT OF THE DISCLOSURE

A furnace installation comprises one or several melting furnaces, particularly electric furnaces and a preheating oven which is arranged before all of the other furnaces. The charge material is contained in large size containers which are transported through the preheating oven by means of a feeding device. The charge buckets are initially moved to the preheating oven on a vehicle which moves along a trackway and the buckets are either transferred from the vehicle vertically into an oven located over the trackway or laterally into a preheating oven located alongside the trackway. The same or similar wheeled vehicle is ararnged to receive the charge bucket at the exit end of the preheating oven and deliver it along a further length of trackway to one or more furnaces. A portion of the length of the trackway is advantageously made, so that it may swivel through an angle for delivering the preheated material selectively into one or more electric furnaces.

SUMMARY OF THE INVENTION

This invention relates in general to a melting furnace installation and in particular to a new and useful furnace installation for gray metal including one or more electric melting furnaces arranged adjacent a preheating oven and with means for feeding the charge material through the oven and into a selected one of the furnaces.

The present invention is particularly applicable for melting gray iron in foundries and a charge material comprises essentially cast iron and steel scrap, cast iron and steel chips, etc. In order to obtain greater economy in melting furnaces, particularly melting furnaces of the electric type and to achieve a continuous operation of these furnaces, it is necessary to preheat the material with which the melting furnaces are to be charged up to temperatures ranging from 200–800° C. At the present time the charge material is presented to the preheating ovens by a conveying system which delivers the material to the oven entrance. The preheated charge material is removed at the oven exit in a similar manner and is passed onto one of the electric furnaces.

The present invention provides an improved furnace installation in which the preheating oven is either arranged alongside or over a trackway along which a wheeled vehicle with the charge bucket containing the charge material is movable. The apparatus includes means for unloading the charge bucket at the entrance to the oven by delivering it either laterally into the oven entrance and then shifting it through the oven, or by first moving it upwardly into alignment with the overhead oven and then shifting it through the oven by directing a pusher member behind it to move it longitudinally. The arrangement also includes means at the exit end of the oven for unloading the charge bucket onto the same or a different rail vehicle which moves along a further length of trackway into association with one or more electric furnaces. In one embodiment the preheating oven is arranged above the trackway and the transfer of the charge bucket is effected first by an elevating device to move the charge bucket into the plane of the oven and then by a pushing device to push it through the oven; and a similar elevator device is used for lowering the bucket at the end of the oven back onto the same, or a different, vehicle which is moved to the position of the discharge location of the oven. In the other embodiment the oven is located alongside the trackway and the transferring apparatus for the bucket includes means for shoving the bucket laterally and then for advancing it longitudinally through the oven. The trackway at the location beyond the discharge end of the heating furnace may be pivoted through a horizontal plane in order to provide a transport trackway for the vehicle containing the charge bucket which leads selectively to a plurality of the furnaces which are arranged around the movement arc of the trackway. The arrangement permits the transfer of the material to be melted into the melting furnaces in as short a time as possible. In addition, the drop height of the charge material from the bottom flaps of the charge bucket to the surface of the melt in the melting furnace is extremely small so that only very minor heat losses occur in the electric furnaces when they are charged.

Accordingly, it is an object of the invention to provide an improved furnace installation which includes a preheating furnace arranged ahead of one or more electric furnaces and a trackway arranged adjacent the preheating furnace over which a vehicle is movable which contains a charge bucket for the charge material; and wherein transfer mechanism is located alongside the trackway for shifting the charge bucket into a position in alignment with the heating oven and for thereafter moving the charge bucket through the oven and for moving it backwardly after it does move through the oven back onto a vehicle movable along the trackway to the heating furnaces.

A further object of the invention is to provide a furnace installation, particularly for melting gray metal which includes a preheating oven for preheating the charge material prior to its being deposited in a heating furnace and in which further includes a wheeled vehicle movable along a trackway arranged either alongside or beneath the oven and with transfer means for transferring a charge bucket from the vehicle into alignment with and then through the heating oven and returned to the trackway for delivery to the furnace.

A further object of the invention is to provide a furnace installation which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWINGS

In the drawings:

FIG. 1 is a side elevational view of a melting furnace and preheating oven installation constructed in accordance with the invention;

FIG. 2 is a top plan view of the installation shown in FIG. 1;

FIG. 3 is a side elevational view of the transport vehicle for the charge bucket shown partly in section;

FIG. 4 is a top plaln view of the vehicle and charge bucket shown in FIG. 3;

FIG. 5 is an enlarged partial side elevational view of the lifting and lowering arrangement for transferring the charge bucket from the carrying vehicle to the charge oven and vice versa;

FIG. 6 is an end elevational view of the mechanism shown in FIG. 5;

FIG. 7 is a view similar to FIG. 1 of another embodiment of the invention; and

FIG. 8 is a top plan view of the installation shown in FIG. 7.

GENERAL DESCRIPTION OF THE PREFERRED EMBODIMENTS

Referring to the drawings in particular, the invention, embodied therein, in FIGS. 1 to 6, includes a furnace installation which comprises a preheating oven 1 for preheating material such as steel scrap, cast iron and steel chips which are carried in a charging bucket 7 in association with conveyor means generally designated 50 for transferring a charge bucket 7 into and through the preheating oven 1 and then for transferring the preheated charge bucket with the charging material into a selected one of a plurality of furnaces such as electric heating furnaces 31 and 31'.

The preheating oven 1 is heated by oil or gas and in the embodiment of FIGS. 1 through 6 is arranged on a platform 2 which in turn rests on supports 4 which are anchored on a shop floor 3. Within the oven 1, the conveyor means 50 for transferring the charge bucket 7 with the charge material comprises a track 6 along which the charge buckets 7 are moved through the preheating oven. The platform 2 is arranged above the shop floor at a height such that a transport passage extending under the oven 1 in a longitudinal direction remains clear. A walkway 8 is arranged on each side of the preheating oven and it includes a railing 9.

The charge buckets 7 are filled or charged with cold charge material at a charging or loading station generally designated 52. Alongside the charging station 52 the conveyor means 50 includes a trackway 40 over which a wheeled vehicle 12 containing the charge bucket 7 is movable. In the position shown in FIGS. 1 and 2, the charge vehicle 12 is located over a weighing device (not shown) for indicating the weight of the material which is charged into the charge buckets 7. At the location of the entrance 10 to the charging oven 1, there is provided first transfer means in the form of a lifting and lowering device 11 which is oriented over the trackway 40 in a position to lift the charge bucket 7 from the vehicle 12 and move it upwardly to the level of the oven 1.

As shown in FIGS. 5 and 6, the lifting and lowering device generally designated 11 includes a supporting frame 13 having 2 beams 14 which are anchored in the shop floor 3 and an upper cross beam 15 on which chain rollers 16 and 16' are located. A chain 17 is directed over each of the chain rollers 16 and 16' and its one end is engaged with a lifting platform 18 which is guided vertically on a vertical beam 14. The lifting platform 18 is equipped with support rollers 20 which are arranged in a horizontal row and which are shown located in a lowered position in 6 and 5 in which they align with a recess 12a which is formed on each side of the charge bucket 7. The opposite end of the chain 17 is connected to a plunger or piston rod member 22 which is guided in a fluid cylinder 21, and the fluid cylinder 21 is connected to a source of fluid pressure for moving the rod 22 either downwardly or upwardly to raise or lower the platform as desired. The lifting mechanism 11 is sized so that the vehicle 12 may move within the frame 13 with room and so that the charge bucket 7 may be moved with the vehicle 12 to cause the recess portion 12a to ride over the rollers 20 as it is moved into position.

As shown in FIGS. 1 and 2, the conveyor means 50 for pushing or moving the charge bucket 7 through the oven 1 comprises a pushing device 23 which is in a form of a fluid pressure movable rod member 25 movable in the cylinder 24 and which is advanced in a direction toward the oven in order to guide the charge bucket through the oven at a controlled rate. The rod 20 is a long stroke plunger rod member having a push rod 26 attached thereto. The stroke of the rod member 25 corresponds approximately to the longitudinal dimension of the bucket 7.

At the exit side of the oven 1, there is arranged second transfer means which also comprises a similar lifting and lowering device 11' which is engageable with the charge bucket 7 in a manner similar to that explained in respect to the lifting and lowering device 11 and it will be operative to move the bucket downwardly from the oven into the lower position at which it can be reloaded on a vehicle and transported further along the trackway 40.

In order to pull the preheated charge bucket from the preheating oven 1, the installation includes a pulling device 27 with two horizontally movable arms 28 arranged on a platform 2. The arms 28 are driven by means of an electric motor acting through a pinion and rod (not shown). The drive is reversible so that the arms 28 can reach into the oven 1 and also can be retracted from the oven region. On the inner side of the arms at their ends facing the oven exit pawls (not shown) are arranged which engaged with dogs (not shown) that are attached at the side walls of the charge buckets 7 when the bucket is withdrawn from the oven.

The track 40 extends along the full length of the oven 1 in a clear space below the oven from the charging point 52 all the way to the two electric furnaces 31 and 31'. The track 40 is formed by L-shaped rails on which the transport vehicle 12 runs. The track includes a section 30 which extends from the end of the heating oven 1 to the electric furnaces 31 and 31' which is mounted for pivotal movement in a horizontal plane about a pivot 56 and it includes an intermediate guide portion 58 which rides over a curved guide rail 33 to permit pivotal movement to shift its axis from the dotted line position 62 to the dotted line position 64 shown in FIG. 2. The rail section 30 is shifted by means of a fluid motor in the form of a work cylinder 34 designed as a dual cylinder having a plunger rod 35 which is connected to the pivotal track section 30. The cylinder 34 is pivoted to the shop floor 3. The track section 30 is shifted as desired to charge either the furnace 31 or 31'.

The transport vehicle for the charge bucket 7 is indicated in FIGS. 3 and 4 and it is designed as a bottom discharge car. The vehicle 12 includes a rear axle 37 which is driven by an electric motor 36 through a chain and sprocket drive 43. The power is supplied by a trailing cable 44 which winds and unwinds automatically on a drum 66. Wheels 52 are arranged on fixed axles of the chassis and four side rollers 51 are provided to guide the vehicle laterally.

The charge buckets 7 are provided with pivotal bottom flaps 38 which may be closed by pivoting them upwardly on a pivot 68 to a position in which they lie flat against the bottom of the charge bucket 7, or they may be swung downwardly as indicated by the one on the left-hand side of FIG. 3. They are held in a closed position by hinged arms 39 which are arranged on a vehicle 12. Whenever a charged bucket is to be discharged over an electric furnace, the transport vehicle 12 has reached the desired position. The arms 39 of the vehicle are swung downwardly by means of the operating cylinders 41 which are controlled by a fluid pressure medium to lower the bottom flaps 38 of the bucket 7 and to permit dumping of the preheated charge material into the electric furnace. The pressurized medium is fed through the working cylinder 41 from a source 42.

The operation of the installation shown in FIGS. 1 through 6 is as follows:

The lifting platform 18 of the lifting device is lowered to its lowermost position and a loaded transport vehicle 12 is moved from the charge station 52 where it is loaded on top of a weighing machine. The bucket 7 on the vehicle 12 is run into the lifting device 11 until the bottom of the bucket rests on the support rollers 20 of the lifting platform 18. The lifting platform 18 is then lifted into its uppermost position shown to the right of FIG. 1 in order to position the bottom of the bucket 7 in the plane of the oven. The bucket 7 is then pushed into the preheating oven by the push rod 26 of the pushing device 23. The transport vehicle 12 is subsequently run under the oven to the discharge station at the exit of the oven. The last bucket located at the exit of the oven, is shown to the left in FIG. 1, is engaged by the arms 28 of the pulling device 27 and is drawn out of the furnace 1 and pushed on to the lifting platform 18 of the lowering device 11' which is first arranged in its uppermost position. The charge bucket is then loaded on the hinged arms 39 of the vehicle 12 which are first oriented in a horizontal position to hold the bottom flaps 38 of the charge bucket closed. The vehicle 12 is then moved along the trackway portion 30, after it has been aligned over a desired furnace 31 or 31'. By operating the hinged arms 39 the bottom flaps 38 of the bucket are released and a preheated material goes into the electric furnace. The empty bucket 7 is returned to the charging station 52 and is again loaded with a charge of material.

The operation described above is then repeated. By inserting the newly loaded bucket in the oven, the front spot in the oven exit which up to then has been vacant after the preceding operation, is again occupied.

In the embodiments shown in FIGS. 7 and 8, similar parts have been similarly designated to that of the first embodiment but with a prime added. The track 45 is arranged alongside the preheating oven 1', instead of underneath it is as in the other embodiment. By this arrangement, the lifting and lowering devices 11 and 11' are not needed. However, the apparatus improves a conveyor means 50' which requires a lateral pushing device 46 arranged to direct the loaded bucket 7' laterally along the guideway or trackway 47 which extends transversely in respect to the oven 1'. The preheating oven includes a conveyor track 48 which is arranged at the end of the transverse trackway 47 and a pushing device 23' similar to the device 23 of the other embodiment is employed for pushing the bucket 7 through the oven 1. The discharge vehicle 12 runs alongside the oven 1 from the charging station 49 at the oven entrance to the discharge station 50 at the oven exit.

The charge bucket 7 is advanced along the track 48 similar to the embodiment shown in FIGS. 1 and 2 by means of the pushing device 23. At the oven exit the last bucket which contains the already preheated material is removed by a pulling device 27. The pulling device 27 is designed similar to the device as indicated in FIGS. 1 and 2. A second telescopic pushing device 46' is arranged at the furnace exit and extends transversely to the track. The bucket 7 with the preheated contents is moved by the transverse 47' backwardly to the vehicle 12 which is advanced along the trackway 45 to the exit location. The transport vehicle 12 with the bucket 7 is then moved to either the electric furnace 31 or 31' along a pivotal trackway section 30'. Once the bucket is oriented over the furnace opening it is opened as in the previous embodiment and emptied.

In the event of a failure of the preheating oven 1, it is, of course, possible to by-pass the oven and to move the charge material immediately into the electrical furnaces.

What is claimed is:

1. A furnace installation particularly for melting gray metal, comprising a loading station for charging material, at least one furnace at a location removed from said loading station, a heating oven located between the charging station and said furnace and having one end with an entrance and an opposite end with a exit for the charging material, a trackway adjacent said oven, extending from said charging station along said oven and to said furnace, a vehicle adapted to contain a bucket for charging material movable along said trackway, first transfer means adjacent said furnace entrance for transferring said charging bucket from said vehicle into alignment with the entrance of said oven, means for directing said bucket of charge material through said oven and out said exit, and second transfer means adjacent said furnace exit for transferring the bucket of charge material from the exit of said furnace back to said vehicle on said trackway at the location of said exit.

2. A furnace installation, according to claim 1, wherein said heating oven is located over said trackway.

3. A furnace installation, according to claim 1, wherein said heating oven is located alongside said trackway.

4. A furnace installation, according to claim 1, wherein said means for directing the charging bucket through the heating furnace includes a pusher element located adjacent said oven entrance and engageable with said bucket to push it through at least a portion of said oven.

5. A furnace installation, according to claim 4, including a pulling member located adjacent said furnace exit and engageable with said bucket to pull the bucket at least partially through said oven.

6. A furnace installation, according to claim 1, wherein said oven is located over said trackway, said first transfer and said second transfer means comprising lifting and lowering means for said bucket.

7. A furnace installation, according to claim 6, wherein said bucket has a bottom wall, said lifting and lowering means including a support platform having a plurality of rollers extending along a horizontal plane, said vehicle being of a height to move into said lifting and lowering mechanism to position said bucket over the support rollers to permit it to be lifted.

8. A furnace installation, according to claim 1, wherein said oven is located alongside the trackway, and is elongated in a direction of the trackway, said first transfer means including means engageable with said bucket to push it in a direction to align it with the entrance of said oven, said second transfer means including a member engageable with said bucket to push it in a direction to position it back on a vehicle on said trackway.

9. A furnace installation, according to claim 1, wherein said trackway including a portion extending between the exit of said oven and said furnace which is pivotal in a horizontal plane, and wherein there are a plurality of said furnaces arranged around the arc of pivotal movement of said trackway.

10. A furnace installation, according to claim 1, wherein said bucket has a bottom with a pivotal flap which may be pivoted downwardly to open said bucket to empty the charge material, said vehicle having a pivot lever which engages with said bottom portion to hold it in a closed position once the bucket is placed on said vehicle, said lever being pivotal downwardly when the bucket is located over the furnace to open the bottom flap to discharge the material into the furnace.

References Cited
UNITED STATES PATENTS 3,476,372   11/1969   Tezuka _____ 266—33 S
3,520,523   7/1970   Sezerba _____ 214—18 SC GERALD A. DOST, Primary Examiner U.S. Cl. X.R.

214—18 SC